Jan. 30, 1962   F. P. DE NEGRI   3,018,565
RADAR SWEEP SIMULATOR
Filed Nov. 25, 1952   7 Sheets-Sheet 1
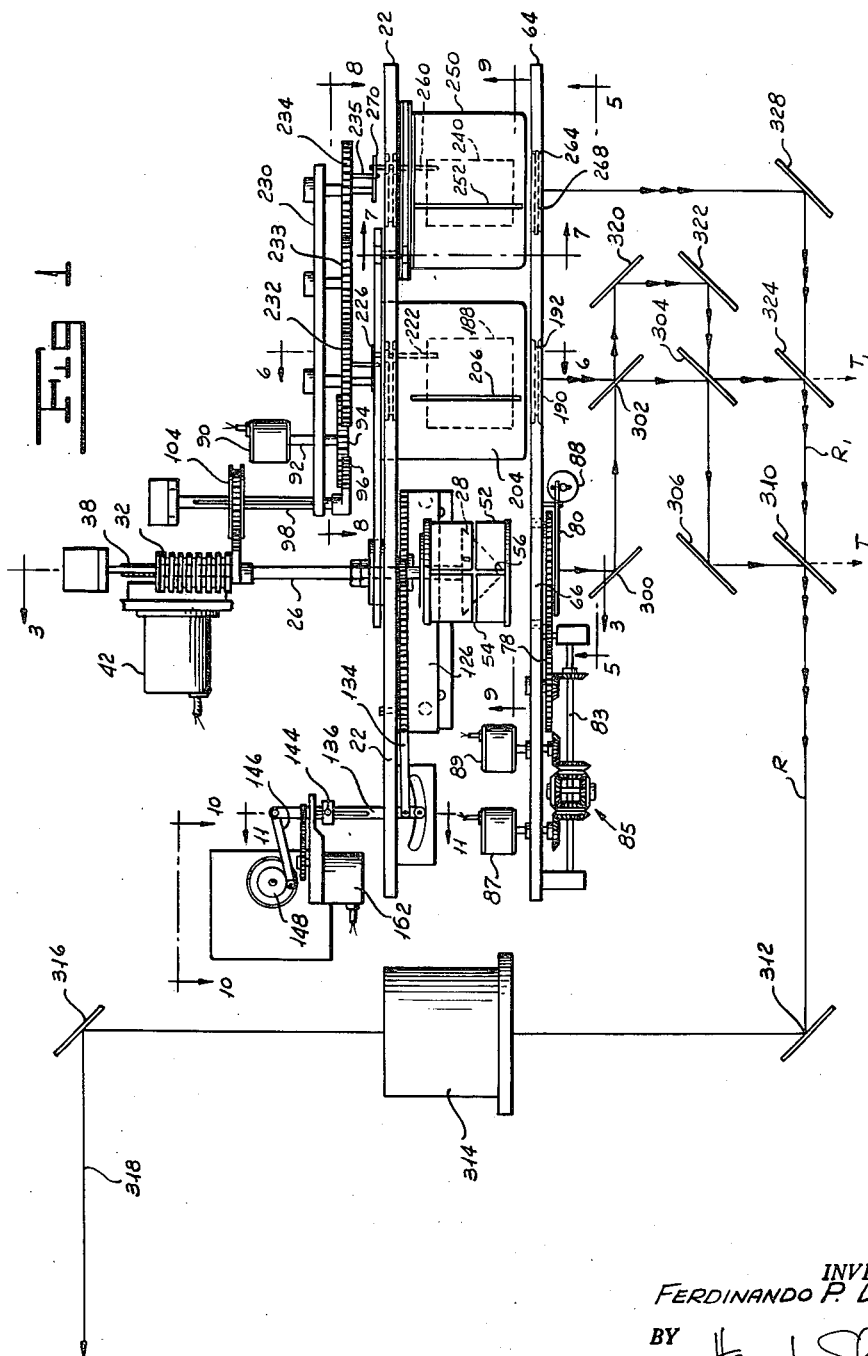
INVENTOR.
FERDINANDO P. DE NEGRI
BY Harry L. Shenier
ATTORNEY Jan. 30, 1962 F. P. DE NEGRI 3,018,565
RADAR SWEEP SIMULATOR
Filed Nov. 25, 1952 7 Sheets-Sheet 2
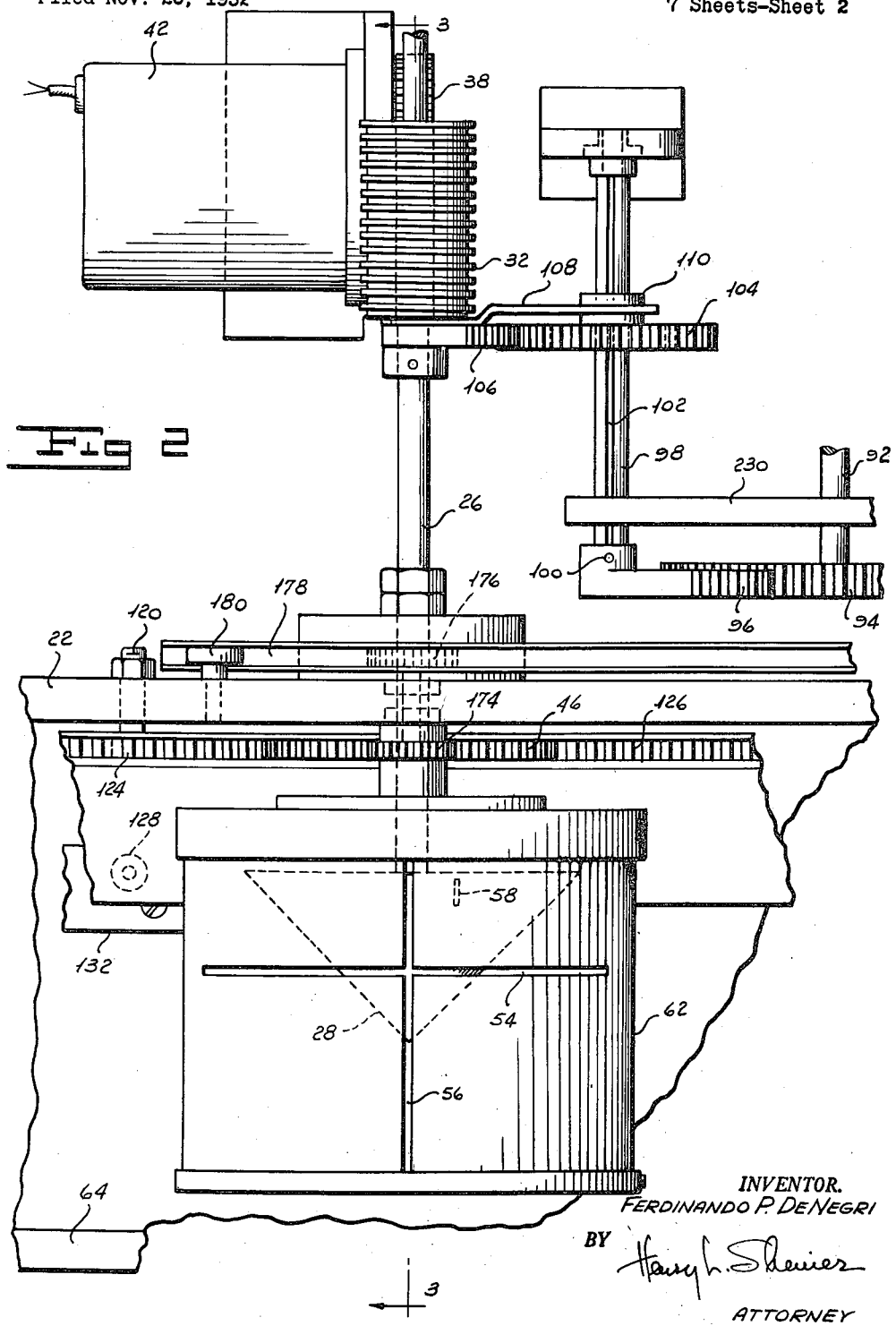
INVENTOR.
FERDINANDO P. DE NEGRI
BY
ATTORNEY Jan. 30, 1962  F. P. DE NEGRI  3,018,565
RADAR SWEEP SIMULATOR
Filed Nov. 25, 1952  7 Sheets-Sheet 3
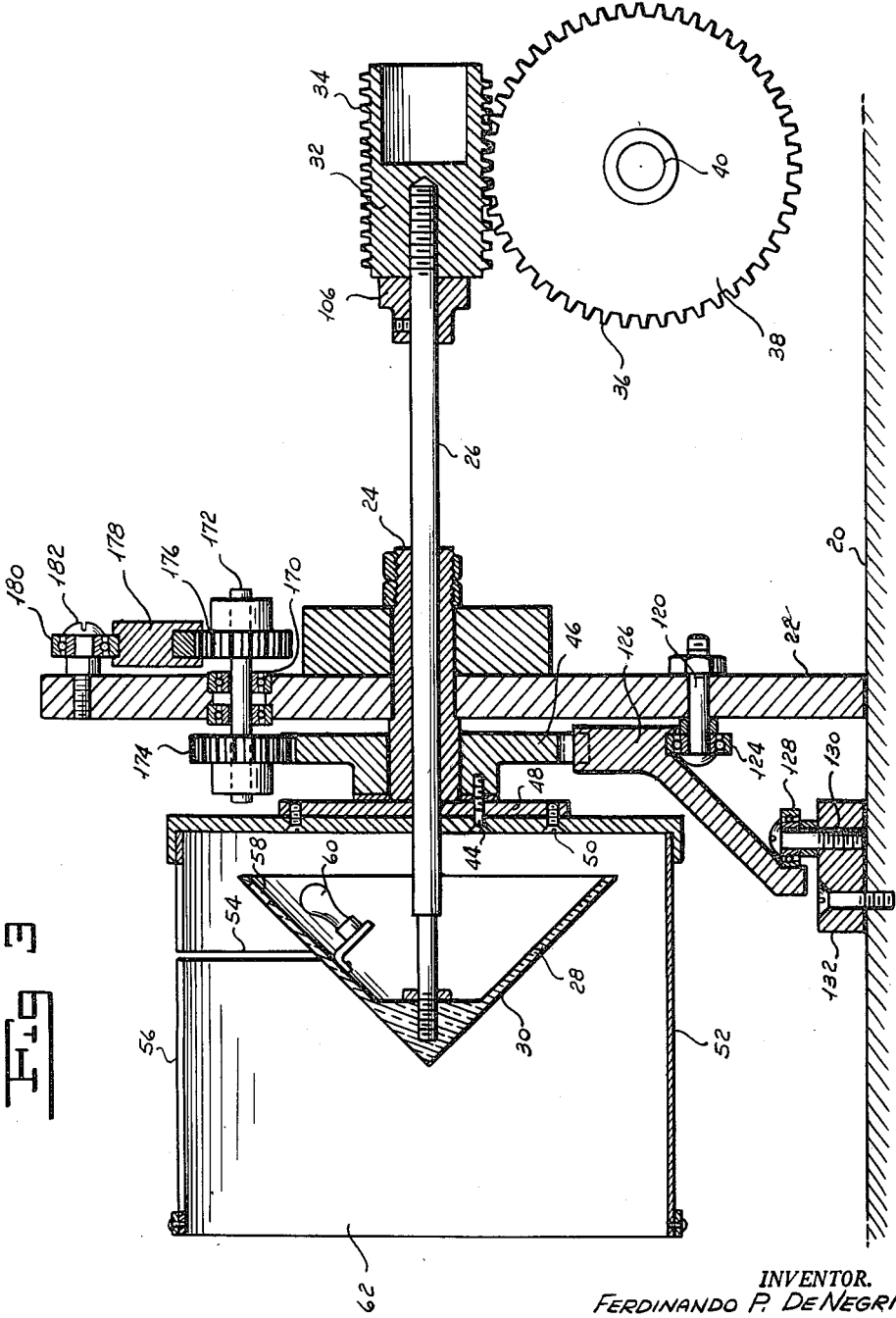
INVENTOR.
FERDINANDO P. DE NEGRI
BY Henry L. Shenier
ATTORNEY Jan. 30, 1962    F. P. DE NEGRI    3,018,565
RADAR SWEEP SIMULATOR
Filed Nov. 25, 1952    7 Sheets-Sheet 4
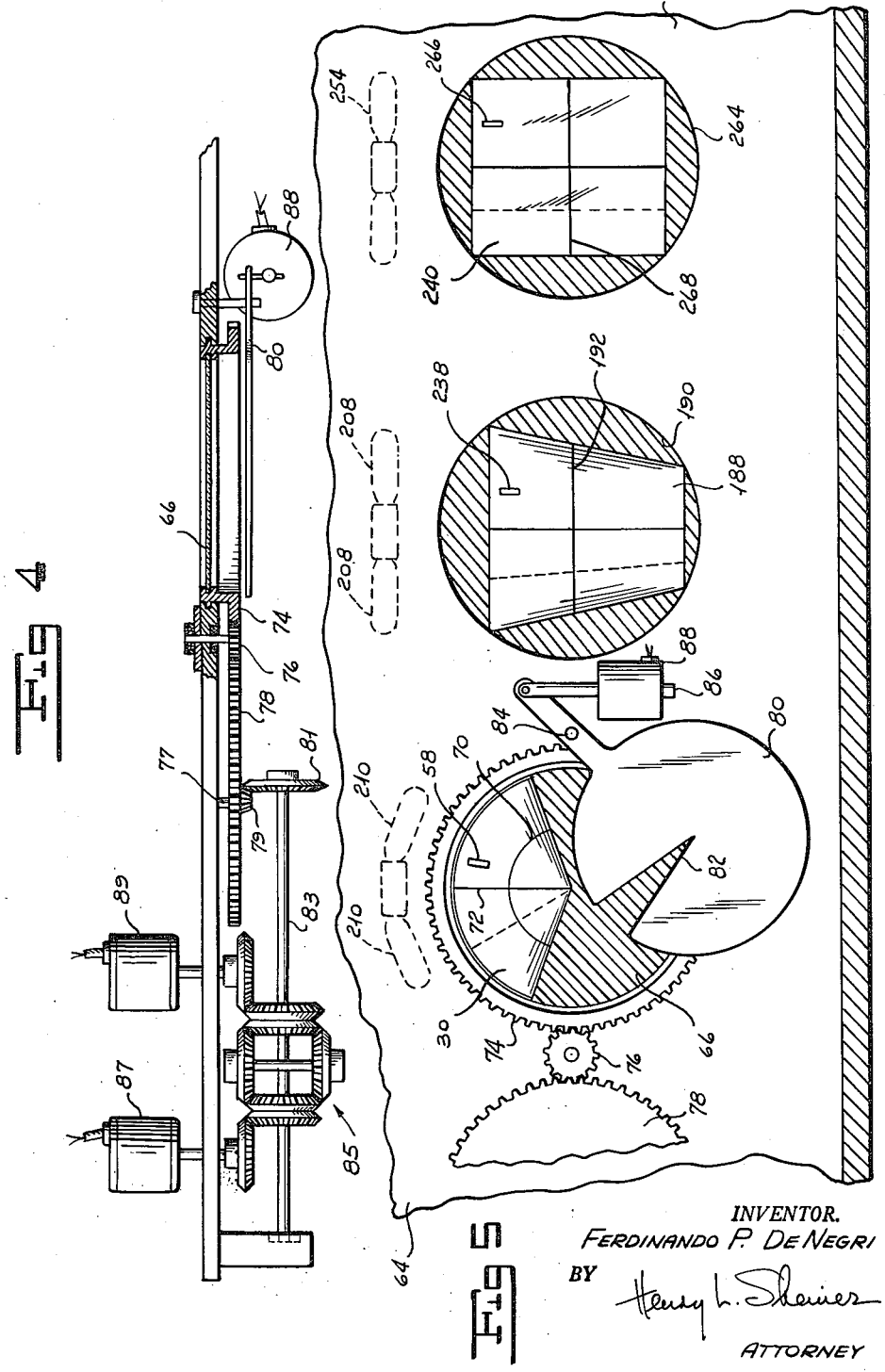
INVENTOR.
FERDINANDO P. DE NEGRI
BY Henry L. Shenier
ATTORNEY

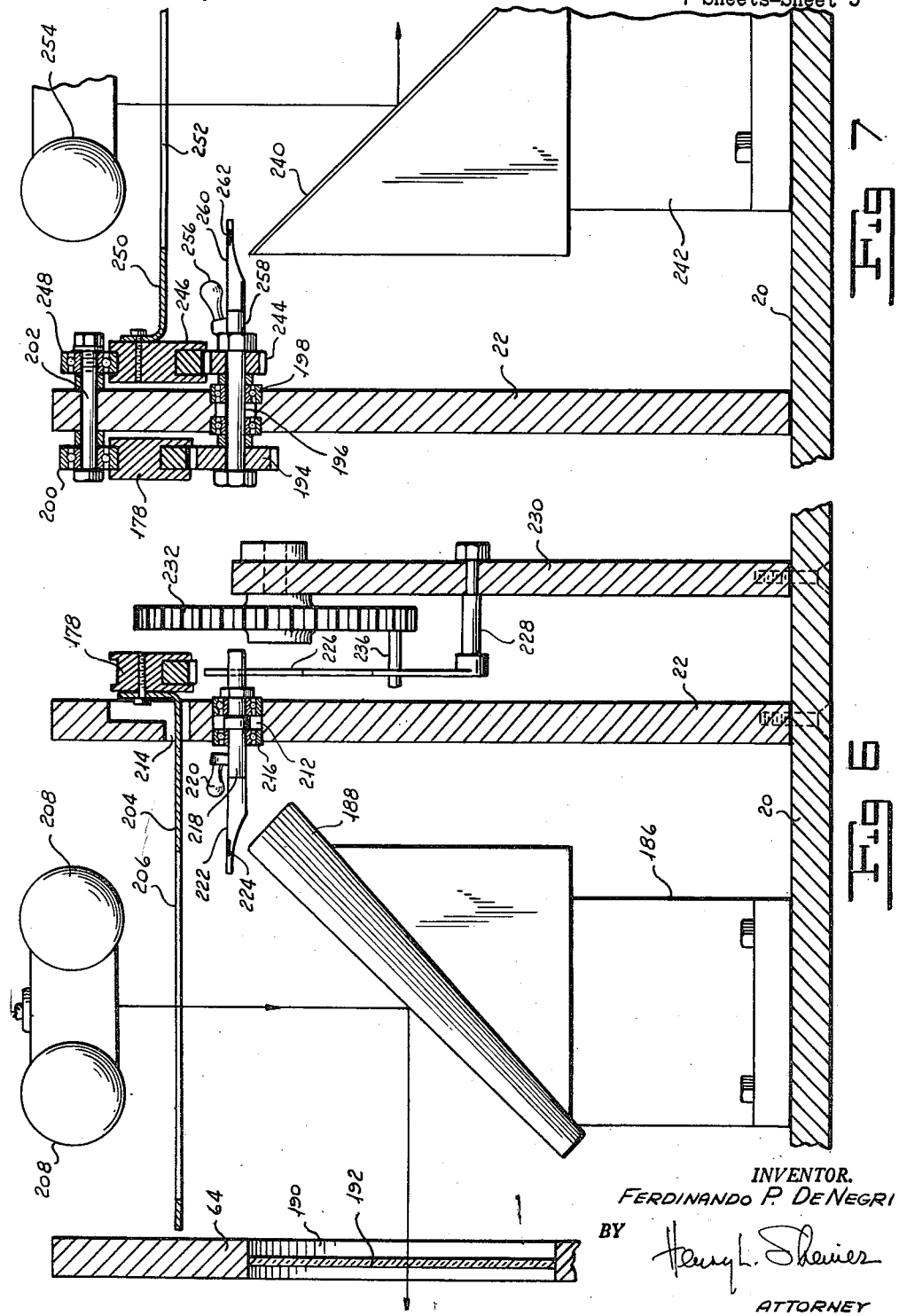

Jan. 30, 1962     F. P. DE NEGRI     3,018,565
RADAR SWEEP SIMULATOR
Filed Nov. 25, 1952     7 Sheets-Sheet 6
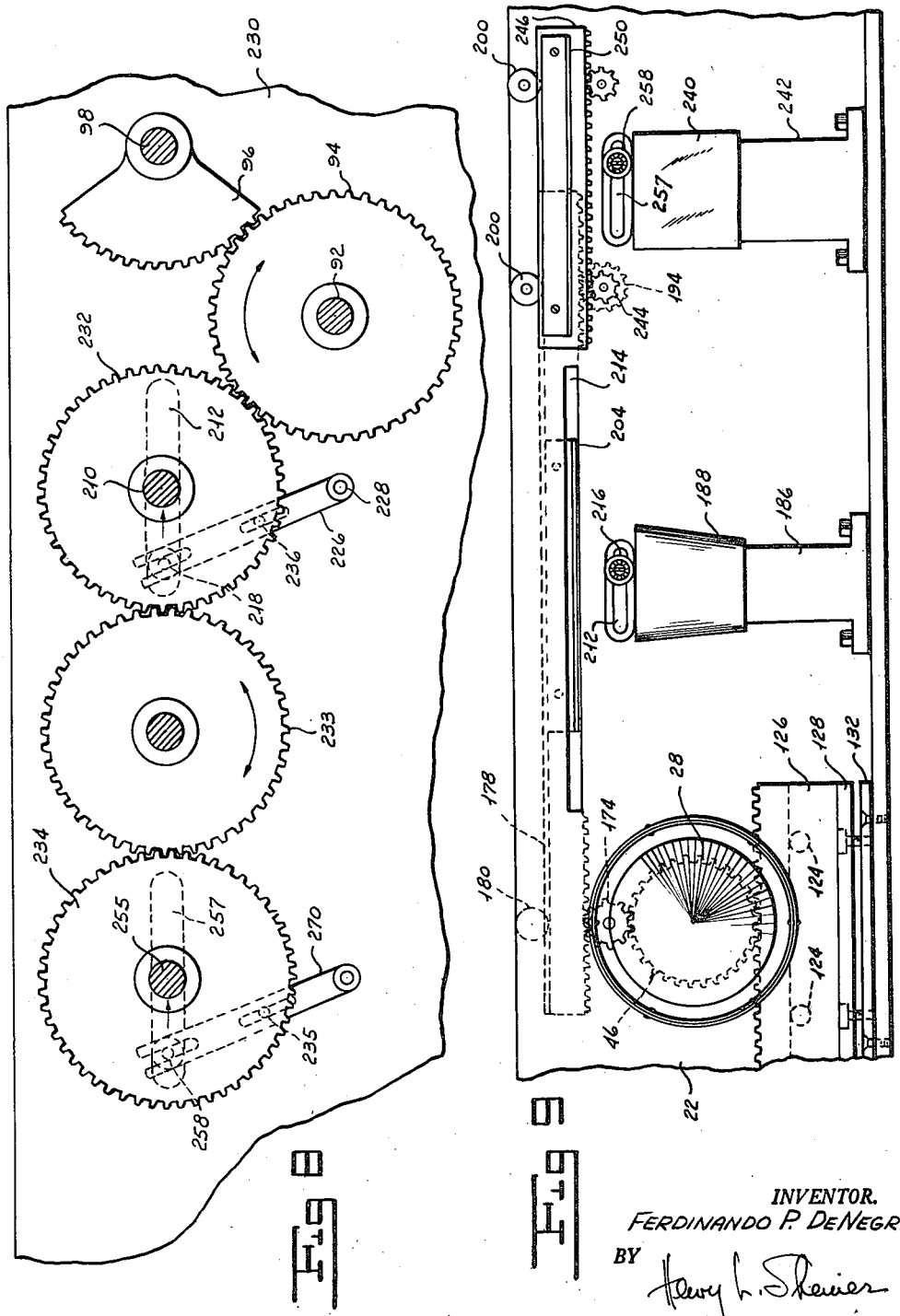
INVENTOR.
FERDINANDO P. DeNEGRI
BY
ATTORNEY.

Jan. 30, 1962 F. P. DE NEGRI 3,018,565
RADAR SWEEP SIMULATOR
Filed Nov. 25, 1952 7 Sheets-Sheet 7

INVENTOR.
FERDINANDO P. DE NEGRI
BY
ATTORNEY

United States Patent Office 3,018,565
Patented Jan. 30, 1962

3,018,565
RADAR SWEEP SIMULATOR
Ferdinando P. De Negri, Fairlawn, N.J., assignor, by mesne assignments, to Cel Elevator Company, Inc., a corporation of New York
Filed Nov. 25, 1952, Ser. No. 322,441
10 Claims. (Cl. 35—10.4)

My invention relates to a radar sweep simulator and more particularly to a mechanism for simulating, without the use of electronic equipment, an oscilloscope used for radar presentation together with a sweep line such as seen in an oscilloscope used with a radar system.

It is desirable in order to train operators of radar systems to provide an arrangement analogous to the actual operation of a radar system which will enable them to view visually the results of their operations. Many radar search and tracking systems provide for a plurality of different presentations. For example, one presentation provides an azimuth line, and a circular range line with variable radius. Normally only a sector of the complete circle is employed and the sweep line is oscillated through this sector. The sector may have an angle of 150° when searching for a target at a comparatively low frequency of, say, a half a look per second. After the target is located the frequency may be increased to two looks per second, at which time the sector is reduced to an angle of 25°.

After a target is located and it is desired to drop a missile, such as a bomb, on the target, the presentation is changed to one having a reticule of straight cross hairs to indicate the point of aim. For distances over twenty-five miles the presentation is an enlarged portion of a 25° sector such that its center appears to be outside the physical limits of the scope. When the distance becomes less than twenty-five miles the 25° sector is enlarged further such that the presentation becomes a rectangle with the sweep line oscillating parallel to the vertical cross hair.

One object of my invention is to provide a radar sweep simulator for accurately simulating a circular range line and a radial sweep line for a search radar presentation.

Another object of my invention is to provide a radar sweep simulator for accurately simulating sweep lines at either frequencies of a half a look per second or two looks per second.

Another object of my invention is to provide a radar sweep simulator for simulating a radar bomb director presentation at distances of over twenty-five miles.

Another object of my invention is to provide a radar bomb director presentation of under twenty-five miles.

A further object of my invention is to provide a radar presentation in which a course mark to indicate the course of the aircraft is automatically simulated in each presentation.

Other and further objects of my invention will appear from the following description.

In general, my invention contemplates an optical and mechanical system in which a desired presentation may be presented along a common line of sight at the will of the operator and in which course, rate of scan and choice of presentation are likewise controllable by the operator.

In the accompanying drawings which form part of the instant specification and which are to be read in conjunction therewith and in which like reference numerals are used to indicate like parts in the various views:

FIGURE 1 is a top plan view of a radar sweep simulator containing one embodiment of my invention.

FIGURE 2 is a fragmentary plan view drawn on an enlarged scale of a portion of the assembly shown in FIGURE 1.

FIGURE 3 is a sectional view taken along the line 3—3 of FIGURE 2, being an enlarged view taken along the line 3—3 of FIGURE 1.

FIGURE 4 is a fragmentary plan view of a portion of FIGURE 1 drawn on an enlarged scale.

FIGURE 5 is an elevation drawn on an enlarged scale viewed along the line 5—5 of FIGURE 1.

FIGURE 6 is a sectional view drawn on an enlarged scale taken along the line 6—6 of FIGURE 1.

FIGURE 7 is a sectional view drawn on an enlarged scale taken along the line 7—7 of FIGURE 1.

FIGURE 8 is a sectional view drawn on an enlarged scale taken along the line 8—8 of FIGURE 1.

FIGURE 9 is a sectional view drawn on an enlarged scale taken along the line 9—9 of FIGURE 1.

Figure 10:
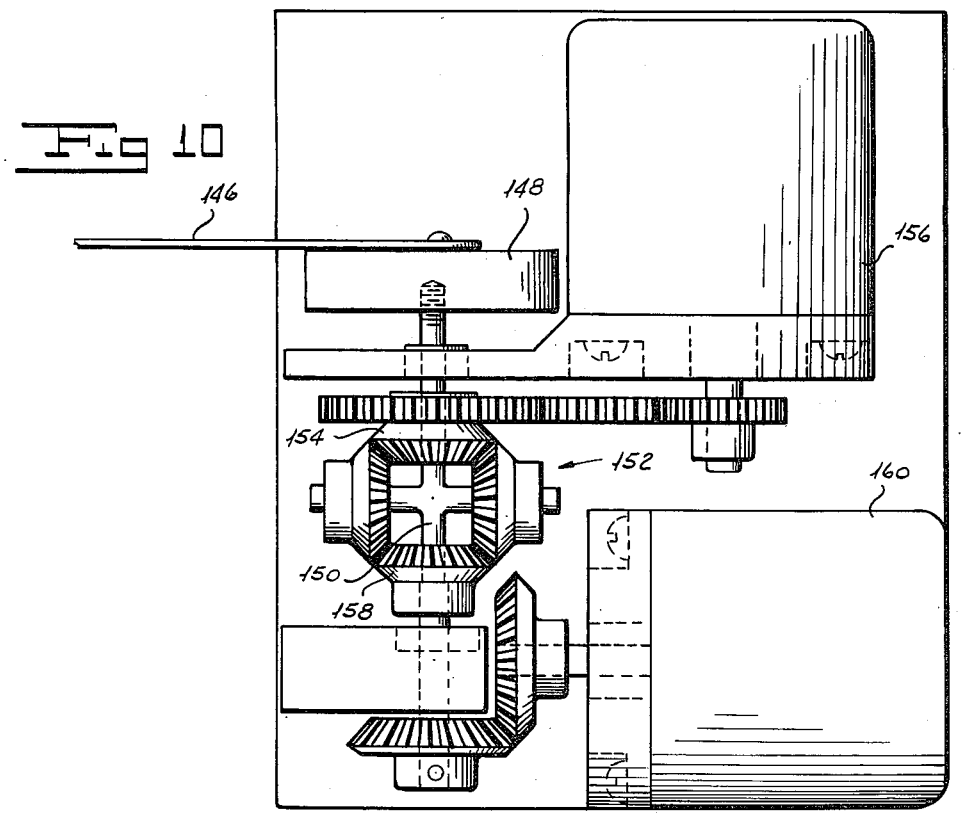
FIGURE 10 is a rear elevation taken along the line 10—10 of FIGURE 1.

Let us now consider the presentation of the search radar in which the range line is indicated by a circle concentric with the observer who is at the center of the circle, and the azimuth is indicated by a radius. It is known that if a straight line of light parallels the axis of a right cone formed with a polished mirrorlike surface and is oscillated around the cone remaining parallel to its axis, it will appear as a line oscillating about the center which is the apex of the cone. It is also known that if this cone is surrounded with a ring of light in a plane perpendicular to the axis of the cone and the cone is moved along its axis, the ring of light as seen from the apex of the cone will appear as a circle of the diameter proportional to the distance from the apex.

Reference is now had to FIGURES 2 and 3 in which on any suitable base 20 I mount a vertical support plate 22 through which is fitted a horizontal bushing 24 in which is lodged a shaft 26. One end of the shaft 26 carries a right cone 28 having a polished surface 30. The other end of the shaft 26 carries a cylindrical rack 32 having teeth 34 meshing with the teeth 36 of a gear 38 secured to a shaft 40 for rotation therewith. The shaft 40 is driven by a Selsyn motor 42 which can be seen in FIGURE 2. A range signal is adapted to be fed to the motor 42 to rotate the gear 38 and thus translate the rack 32 and hence the shaft 26 and the cone 28 as a function of range.

Secured to the bushing 24 by means of screws 44 I provide a gear 46. On the bushing is a flange 48 to which I secure by means of screws 50 a cylindrical housing 52 surrounding and concentric with the cone 28. The housing is provided with a slot 54 transverse to the axis of the cone and a slot 56 parallel to the axis of the cone, as can readily be seen by reference to FIGURE 2. The remainder of the cylinder is opaque. The surface of the cone is provided with an aperture 58 behind which is positioned an incandescent lamp 60. This aperture 58 produces the course mark. A light source which will be described later is positioned above the slots 54 and 56. The slit of light made by 54 produces an arc of light around the polished surface 30 of the cone 28 which, when viewed from the open end 62 of the housing 52, will produce a range line. It will be observed that the cone can be translated by the range motor 42 acting through gear 38 and the cylindrical rack 32. As the cone is moved to the right as viwed in FIGURE 3 the arc of light will appear to move toward the apex of the cone and represent a shorter range. As the rack is moved to the left the arc of light will appear to grow larger and represent a longer range. A second vertical plate 64 is mounted on the base 20 forward of the plate 22, as can be seen by reference to FIGURE 1. This plate is fitted with an aperture concentric with the apex of the cone 30 and it is provided with a mask 66, as can readily be seen by reference to FIGURE 5. The mask permits the view of a 150° sector, as can readily be seen by reference to FIGURE 5 in which the range line 70 appears on the polished surface 30 of the cone 28. The light shining through the slot 58 furnishes the course mark. The reflection of light through the slot 56 appears as the sweep line 72 in FIGURE 5. The mask 66 is mounted in a rotatable member formed with a ring gear 74 meshing with a pinion 76 driven by a gear 78. The rotation of the gear will orient the mask to vary the 150° arc through which a search is being conducted. A second mask 80 provided with a 25° sector 82 is pivotally mounted on plate 64 around pin 84 and adapted to be rotated through an armature 86 upon the energization of solenoid 88. The mask 80 limits the field of view to a 25° arc when in place.

Referring now to FIGURES 1 and 2, a motor 90 is adapted to be energized by a course signal to drive a shaft 92 which carries a gear 94. The gear 94 meshes with a gear segment 96 which is secured to a shaft 98 for rotation therewith by means of pin 100. The shaft 98 carries a gear 104 secured thereto for rotation therewith but free to move axially therealong. This is accomplished by means of key 102 formed on the shaft 98. The gear 104 meshes with a segment 106. A yoke 108 engages a groove 110 in hub of gear. In this manner as the cylindrical rack 32 translates carrying the segment 106 along, the gear 104 will be carried along always in mesh with the segment 106. In this manner the motor 90 will rotate the shaft 26 to vary the position of the course mark 58 in accordance with the course signal impressed upon the motor 90.

Figure 11:
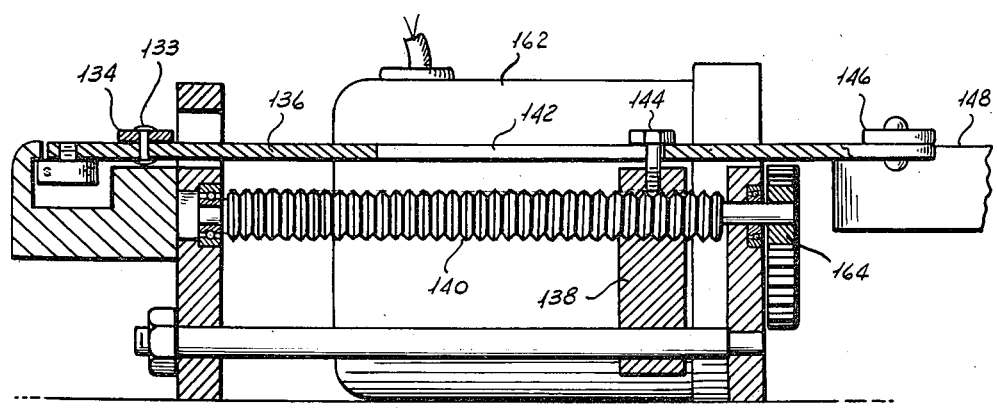
FIGURE 11 is a sectional view taken along the line 11—11 of FIGURE 1.

Referring now to FIGURE 3, the plate 22 carries below the shaft 26 a pair of shafts 120 each fitted with ball bearings 124 upon which is mounted for horizontal reciprocation a rack 126. The lower end of the rack is guided by bearings 128 mounted on vertical shafts 130 carried by a member 132 secured to the base 20. The gear 46 meshes with this rack and is adapted to be driven by it. As can be seen by reference to FIGURE 1, the rack 126 is connected by a link 134 to a pivoted lever 136 which is shown on a larger scale in FIGURE 11. The lever 136 is pivoted intermediate its ends to a carriage 138 which is mounted on a screw 140. The lever 136 is formed with a slot 142 through which a pivot bolt 144 passes, the bolt being carried by the carriage 138. The other end of lever 136 is connected to a link 146 which is pivotally positioned adjacent the periphery of a rotary member 148 best seen in FIGURE 10. The rotary member is carried by and adapted to be driven from the differential shaft 150. The differential, indicated generally by the reference numeral 152, is provided with an upper gear 154 connected by a gear train to a first motor 156. The lower differential gear 158 is connected to be driven through suitable gearing by the motor 160. The control system is such that one or both of motors 156 or 160 is adapted to be automatically energized. The gear ratios are such that the motor 160 will drive the rotary member 148 at a speed to oscillate the lever 136 at a speed equivalent to two looks per second. The gear ratios by which motors 156 and 160 are connected to two differential inputs are such that the speed of rotary member 148 will be such that the lever 136 will be oscillated at a frequency equivalent to a half a look per second. By a "look" I mean a traverse of the line of light corresponding to the sweep line across the segment being viewed through the mask of the device. The throw of the end of lever 136 which is connected to the rack 126, and hence the throw of the rack 126, is made proportional to the angle of scan and this must be adjustable. A motor 162, shown in FIGURE 11, is connected by a suitable gear train to drive pinion 164 which is secured to the end of the screw 140. The rotation of the screw 140 will traverse the carriage 138 and the fulcrum bolt 144 around which the lever 136 pivots along the slot 142, thus changing the fulcrum. It will be clear from a reference to FIGURE 11 that when the fulcrum 144 is to the right the pin 133 which connects the link 134 to the lever 136 will have a longer throw and hence a wider angle of scan. Conversely, when the fulcrum 144 is to the left of the slot 142 the throw of the rack 126 will be less and hence proportional to a narrower angle of scan.

Referring again to FIGURE 3, it will be seen that I control the rack 126 in its reciprocatory motion both as to speed and in amplitude by selectively energizing motors 156 and 160 and by positioning fulcrum 144. The motion of the rack 126 is communicated to the gear 46 which is secured to the bushing 24 and hence to the housing 52. The oscillation of the gear 46, therefore, in response to the motion of the rack 126 will oscillate the housing 52 to produce an oscillation of the sweep line generated by the light passing through the coaxial slot 56.

Still referring to FIGURE 3, the plate 22 carries a pair of bearings 170 in which is rotatably mounted a shaft 172. To one side of the plate 22 the shaft carries a pinion 174 meshing with the gear 46. On the other side of plate 22 the shaft 172 carries a gear 176 which meshes with a rack 178, the upper portion of which engages a bearing 180 carried by the screw 182 attached to the plate 22. By the arrangement just described, it will be clear that the reciprocatory motion of the rack 126 of a certain amplitude and frequency will be communicated through gear 46, pinion 174, shaft 172 and pinion 176 to the rack 178.

Thus far we have described the simulation of the search radar at great distances and at small magnification. We will now consider the presentation which is made at larger magnification when a small area is being considered at a range of over twenty-five miles. In order to get the magnification I must use a cone having a much larger radius. Since this presentation is used in connection with a reticule having cross hairs no change in range will be necessary. Accordingly, I use a section of the surface of a right cone so that the sweep line will appear as a line oscillating about a center which is outside the field of view of the presentation. The polished section of the surface of a right cone and its mounting are shown in FIGURE 6 to which reference is now had. It will be observed that forward of the plate 22 and upon base 20 I mount a pedestal 186 carrying a metal member 188 formed with a polished surface and lying along the locus of the surface of a right cone. The axis of the surface 188 forms an angle of 45° with the horizontal. The plate 64 which is forward of the plate 22 is formed with an aperture 190 in which I mount a reticule 192 having cross hairs which can be seen by reference to FIGURE 5.

The rack 178, as shown in FIGURE 9, has its left-hand end supported by the pinion 174 and its right-hand end supported by a pinion 194 which can be seen in FIGURES 9 and 7. The pinion 194 is carried by a shaft 196 mounted in bearings 198 carried by the vertical plate 22. A positioning bearing 200 similar to bearing 180 engages the upper portion of the right-hand end of rack 178. This bearing 200 is carried by shaft 202 mounted in the plate 22. Secured to the rack 178 I mount a horizontal mask 204 provided with a longitudinal slot 206. Immediately above the slot I position a light source such as a pair of incandescent lamps 208. These lamps are of the same nature as the lamps 210 shown in FIGURE 5 which are positioned above the housing 52. It will be remembered that the rack 178 is reciprocated in accordance with a frequency agreeable to the frequency of scan and at an amplitude corresponding to the amplitude of scan. This will cause the mask 204 to reciprocate in phase so that a slit of light through the slot 206 will fall upon the polished surface of the segment of the cone 188. This will cause a sweep line in the form of a reflected slit of light to move as a line oscillating about a center below the field of presentation as shown in FIGURE 5.

A horizontal slot 212 is formed in the plate 22 underneath the slot 214 through which the mask 204 projects.

In this slot I position a pair of bearing rollers 216 supporting a member 218 which carries an incandescent lamp 220 and a shield 222 formed with an opening 224 through which light from the lamp 220 is adapted to pass. The member 218 projects through the plate 22 and is secured at its upper end to an oscillatory member 226, the lower end of which is pivotally carried by shaft 228 secured to a plate 230 mounted on the base 20.

Referring now to FIGURE 1, it will be seen that the gear 94 which is driven by the course motor 90 meshes with a gear 232 which in turn meshes with an idler gear 233 which meshes with a gear 234. These gears are mounted on shafts carried by the plate 230. The gear 232 which is shown on an enlarged scale in FIGURE 6 is provided with a pin 236 which is lodged in a slot formed in the oscillating member 226. As the course motor is operated not only will it rotate the course mark of the first presentation, but it will also reciprocate the shield 222 in accordance with the course signal. This places a course mark 238 upon the presentation being described, as can be seen by reference to FIGURE 4. It will be seen that the same mechanism which provides rate of scan and angle of scan for the first presentation provides this information and drives the mask 204 to simulate a sweep line on the second presentation. It will be further seen that the course information is fed to the second presentation.

When the area of the field of view becomes large due to a shortening of the range, say under twenty-five miles, the cone is so large that a segment of its surface can be considered for practical purposes as flat. For the close presentation, therefore, I use a flat mirror 240 shown best in FIGURE 7. A bearing member 242 is mounted on the base 20 forward of the vertical plate 22 to support the mirror at an angle of 45° with the horizontal. The other end of shaft 196 carries a pinion 244 which meshes with a second rack 246 which is held in position by a bearing roller 248 carried by the other end of shaft 202. The rack 246 carries a mask 250 provided with a longitudinal slot 252 similar to the slot 206 in the mask 204. Above the mask 250 I position a suitable light source such as an incandescent lamp 254 adapted to project a slit of light upon the polished surface of the flat mirror 240 through the slot 252. The pinion 194 will be oscillated through rack 178 with a motion agreeable to the scanning motion both in amplitude and in frequency. The pinion 194 will rotate shaft 196 and hence pinion 244 and thus drive rack 246 and the mask 250 in accordance with the scanning motion which the sweep line should have. An incandescent lamp 256 is carried by a member 258 similar to member 218. The member 258 carries a shield 260 provided with a slit 262 adapted to erect a course mark upon the surface of the mirror 240. The plate 64 is provided with an aperture 264 similar to the aperture 190 and is likewise provided with a reticule. The presentation can be seen by reference to FIGURE 5 in which the course mark 266 formed by light shining through the slot 262 is shown. The reticule 268 for this presentation is likewise provided with cross hairs and the sweep line will appear to move parallel to the vertical cross wire. The member 258 is oscillated in accordance with course by means of gear 234 which carries a pin 235 similar to the pin 236 of gear 232, as can readily be seen by reference to FIGURE 8. It engages a pivoted lever 270 best shown in FIGURE 8 similar to the lever 226 heretofore described. The member 258 reciprocates horizontally, being carried by a bearing similar to bearing 216, in a slot 257 similar to slot 212. It will be recalled that each of the presentations may be viewed through suitable apertures in the plate 64.

Referring now to FIGURE 1, I mount a system of mirrors on the base 20. The light coming through the left-hand aperture in FIGURE 1 is reflected by mirror 300 to the surface of mirror 302, thence to the surface of mirror 304 to the surface of mirror 306 and from the surface of mirror 310 to the mirror 312 and thence through a prism 314 to a mirror 316 along the line 318 to the observer. The mirror 300 is silvered on its upper surface only. The mirror 302 is full silvered on both faces. The mirror 304 is full silvered on both faces. The mirror 306 is silvered on its under face only. The mirror 310 is one-third silvered, that is, it will reflect only one-third of the light cast upon it and will permit two-thirds of the light cast upon it to pass through it. Accordingly, the light reflected from the first presentation by mirror 300 which is reflected by mirrors 300, 302, 304 and 306 to mirror 310 has two-thirds of its light passed downwardly in the direction of the arrow T and only one-third of the light will pass along the line R to the mirror 312. In other words, two-thirds of the light is transmitted by one-third silvered mirror 310 and one-third of the light is reflected. The image viewed through aperture 190 will be reflected by mirror 302 to mirror 320, thence to mirror 322 and thence to mirror 304 to mirror 324. Mirror 324 is one-half silvered, that is, one-half the light striking the mirror 324 will pass downwardly along the dotted line $T_1$ and the other half will be reflected along the line $R_1$ to the mirror 310. In this case two-thirds of the light along the path $R_1$ will pass through the one-third silvered mirror 310 and one-third of the light will be reflected. It will be seen that the light along the path R, therefore, through aperture 190 will be two-thirds of one-half of the light reflected through the aperture, or one-third of the total light. The intensity of the light, therefore, from aperture 190 viewed by the observer along the line 318 will be the same as that in the first presentation, namely one-third of the intensity of illumination. It is to be remembered that I intend to illuminate all three presentations with the same candle power. Coming now to the light reflected through aperture 264 from the last presentation, this first strikes full silvered mirror 328 and is reflected through a half silvered mirror which transmits half the light along the path $R_1$ and reflects half the light along the path $T_1$. We have then the same case as in the second presentation. The light along path R, therefore, will be two-thirds of the light transmitted along path $R_1$, or two-thirds of one-half, or one-third of the light of the source. In each case the light viewed by the observer along path 318 is one-third of the original illumination. It is to be understood that the images provided by the respective reflecting surfaces 30, 188, and 240 are adapted to be viewed selectively. This may readily be accomplished in any convenient manner by switching on only one of the respective sets of lamps 210, 208, or 254 at a particular time. The optical system is so arranged that it will transmit the image from any one of the three reflecting surfaces to the common mirror 312.

The housing 314 represents a prism which is adapted to be rotated by any suitable means (not shown). The rotating prism is adapted to change the presentation as viewed from a position of azimuth uppermost to north uppermost. It may be desirable when scanning for long ranges through 150° angle to have either azimuth up or north up. The presentation can be readily rotated, as is well known to the art, optically by means of a rotating prism.

It is to be noted that the range motor 42 is controlled not only by range but also by magnification. If the range is thirty miles and the magnification one, if the magnification is increased to two the range line will be driven to a point equivalent to a range of fifteen miles with a magnification of one. Similarly, if the magnification is three, the range line will be moved to a position equivalent to a range of ten miles with a magnification of one.

The position of the course mark, it will be remembered, was governed by the rotation of motor 90. The course mark is by definition the true bearing of the aircraft modified by a wind correction. Hence, when the reference axis of presentation is true bearing such as exists for the 150° sweep with azimuth up and for all north up presentations, then the only information necessary to drive the course mark is the wind.

Referring again to FIGURES 4 and 5, it will be observed that the gear 78 is mounted on a shaft 77 provided with a bevel gear 79 which meshes with a bevel gear 81. The bevel gear 81 is carried by the shaft 83 of a differential indicated generally by the reference numeral 85. The differential is adapted to be selectively driven from either or both motors 87 and 89 depending on the choice of vertical reference needed for the presentation viewed through aperture 66. When searching with a north up presentation a change in course will require a change in the orientation of the mask since the search radar which is being simulated has only a 150° arc of search.

It will be seen that I have provided a marker generator mechanism capable of simulating without the use of electronic equipment a radar oscilloscope as seen in connection with a bomb director. A circular radar range line as seen in the 150° and 25° scanning presentations is provided. A course mark for both the 150° and 25° scanning presentations and a control for this course mark is provided. I have provided means for scanning at two frequencies of either one-half a look per second or two looks per second. I have provided an over twenty-five mile sweep line and course mark together with a choice of either azimuth up or north up for any of these presentations.

I have provided a radar sweep simulator for accurately simulating a circular range line and a radial sweep line for a search radar presentation. My assembly is useful in training operators in employing the bomb director or related radar equipment.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described my invention, what I claim is:

1. In a device of the character described, a mask formed with an aperture representing the face of a cathode-ray tube associated with a radar system, a conical reflecting surface having an axis, means for positioning the reflecting surface behind the mask with said surface axis generally perpendicular to the plane of the mask, a light source positioned above the reflecting surface, a shield formed with an elongated slot means positioning said shield between the light source and the reflecting surface with the longitudinal axis of said slot and said surface axis lying in a common plane, means for oscillating the shield transverse to the longitudinal axis of the slot, means for controlling the speed of oscillation of the shield and means for controlling the amplitude of oscillation of the shield, the construction being such that a slit of light will pass through the shield slot and be reflected by the reflecting surface through the mask aperture to simulate the sweep line of a radar system.

2. A device as in claim 1, in which the oscillation of the shield is rotary.

3. A device as in claim 1, in which the oscillation of the shield is reciprocatory.

4. A device as in claim 1, in which said reflecting surface is in the shape of a right cone.

5. A device as in claim 1, in which said shield is formed with a second elongated slot positioned at right angles to and intersecting the first slot, said reflecting surface is a right cone, and means for moving the cone along its axis longitudinally of said first slot, the construction being such that a slit of light will pass through said second shield slot and be reflected by the surface of the cone to generate an arcuate line simulating the range line of a radar system.

6. A device as in claim 1, including a second mask formed with a different aperture, means for positioning said second mask adjacent the first mask clear of its aperture and means for swinging the second mask into a position over the first mask to change the aperture presented by the first mask.

7. A device as in claim 1, including a course-marking member formed with a window, a light source positioned behind the window to enable a spot of light to be viewed through the mask aperture, means for mounting the course-marking member for movement along the direction of oscillation of said shield and means for moving the course-marking member.

8. A device as in claim 7, in which said course-marking member is positioned above the reflecting surface.

9. A device as in claim 7, in which the reflecting surface is formed with an aperture, the light source being positioned behind said aperture.

10. In a device of the character described a mask formed with an aperture representing the face of a cathode ray tube associated with a radar system, a conical reflecting surface having an axis, means for positioning the reflecting surface behind the mask with the surface axis generally perpendicular to the plane of the mask, a light source positioned above the reflecting surface, a shield having an axis and formed with an elongated slot, means positioning said shield between the light source and the reflecting surface, said slot being disposed in a plane at right angles to said shield axis and means for moving said reflecting surface axially of said shield, the construction being such that a slit of light passes through said slot and is reflected by said reflecting surface to generate an arcuate line simulating the range line of a radar system.

References Cited in the file of this patent

UNITED STATES PATENTS

| | | |
|---|---|---|
| 2,021,889 | Fahrney | Nov. 26, 1935 |
| 2,443,631 | McDermott et al. | June 22, 1948 |
| 2,505,793 | Rust et al. | May 2, 1950 |
| 2,633,648 | Amman | Apr. 7, 1953 |
| 2,639,421 | Miller | May 19, 1953 |
| 2,716,234 | Lester | Aug. 23, 1955 |
| 2,841,885 | Hall | July 8, 1958 |